United States Patent [19]

Charm et al.

[11] Patent Number: 4,779,641
[45] Date of Patent: Oct. 25, 1988

[54] SANITARY CONTROL BACK PRESSURE DIAPHRAGM VALVE AND SANITARY CONTROL SYSTEM EMPLOYING SAID VALVE

[75] Inventors: Stanley E. Charm, Newton; Steven Landau, Boston, both of Mass.

[73] Assignee: Penicillin Assays, Inc., Malden, Mass.

[21] Appl. No.: 94,822

[22] Filed: Sep. 9, 1987

[51] Int. Cl.[4] .................. B08B 3/04; B08B 9/06; F16K 31/128
[52] U.S. Cl. ...................... 137/238; 134/168 C; 134/169 C; 251/25; 251/45; 251/61.2
[58] Field of Search .................. 137/510, 240, 238; 251/25, 45, 46, 61, 61.1, 61.2, 61.3, 61.4, 61.5; 92/99, 103 R; 134/166 C, 167 C, 168 C, 169 C

[56] References Cited

U.S. PATENT DOCUMENTS

| | | | |
|---|---|---|---|
| 2,877,978 | 3/1959 | Rider et al. | 251/46 |
| 3,416,461 | 12/1968 | McFarland | 92/99 |
| 3,659,625 | 5/1972 | Corner et al. | 251/61.1 |
| 3,703,188 | 11/1972 | Wagner | 137/510 |

FOREIGN PATENT DOCUMENTS 838612 3/1939 France .................. 137/510

Primary Examiner—George L. Walton
Attorney, Agent, or Firm—Richard P. Crowley

[57] ABSTRACT

A sanitary control back pressure diaphragm valve employed in a sanitary control system wherein the sanitary valve controls the pressure applied to a fluid in a sanitary contained system, which valve comprises: a valve body having an upper and lower valve member defining a generally conical fluid passageway and a valve seat, the members adapted to move between an open position and a closed position; a diaphragm support between the upper and lower members and a resilient diaphragm on the members on the diaphragm support to provide a seal between the upper and lower members and to provide for relative movement of said valve members between the open and closed valve position, the upper and lower valve members defining a generally conical valve passageway between the valve members, and the valve including a pressurized air inlet to provide controlled air pressure of one member; a sanitary fluid inlet extending in a straight line at an angle into the fluid passageway and a sanitary fluid outlet for the discharge of sanitary fluid from the valve, and optionally, the resilient diaphragm having a plurality of extending channels therein between the upper and lower valve members.

7 Claims, 1 Drawing Sheet

4,779,641

SANITARY CONTROL BACK PRESSURE DIAPHRAGM VALVE AND SANITARY CONTROL SYSTEM EMPLOYING SAID VALVE

DESCRIPTION

Background of the Invention

It is often desirable in the processing of various sanitary fluid materials to process the materials at controlled pressure and high temperature in a sanitary-type system employing a sanitary control valve so as to provide a fixed or variable pressure applied to the fluid or the suspended solids in the fluid in such a sanitary-contained system. In such system, by using a fixed air pressure, the pressure being applied to the sanitary fluid through the valve is kept constant even though the sanitary fluid may be subject to other processing variables, while further varying the air pressure, the pressure applied to the sanitary fluid may be proportionately varied. It is desirable in such sanitary systems to provide a sanitary control valve which does not tend to entrap sanitary fluid, or solids from the sanitary fluid, and which is easily flushed and cleaned, and provides for a good seal, particularly at controlled pressures and temperatures. Prior art control valves employed in sanitary controlled systems typically contain cavities and passageways in the valve wherein a trapped sanitary fluid cannot be easily removed by flushing and generally certain corners which are not smooth. Often the valve must be disassembled to remove entrapped fluids and solids making the sanitary control valve difficult to clean.

SUMMARY OF THE INVENTION

This invention relates to a sanitary control valve and to a sanitary control system employing the sanitary control valve. In particular, this invention concerns a sanitary control back pressure diaphragm-type valve which prevents the entrapment of sanitary fluids, or solids from the sanitary fluid, and may be easily flushed clean, and which valve provides an improved diaphragm seal.

The sanitary control valve of the invention provides a means by fixed or variable air pressure to control the pressure applied to a sanitary fluid, or to suspended solids in a sanitary fluid, in a sanitary-contained system. The sanitary valve, by using a fixed air pressure, maintains a constant pressure on the sanitary fluid through the valve, and by varying the air pressure, the pressure applied to the sanitary fluid is adjusted as desired. The sanitary valve is thus a direct method, back pressure, diaphragm-type sanitary valve wherein the internal valve passageway is characterized as a generally conical passageway with a direct sanitary fluid outlet from the valve seat. The sanitary fluid inlet is characterized by a straight line passageway which intercepts the internal passageway at a minor angle thereby providing a smooth, more direct passageway into the main valve passageway which contains no cavities for the entrapment of sanitary fluid and which permits easy flushing of the sanitary valve through the passageway without disassembling the valve to remove any entrapped sanitary fluid or to clean the valve.

In particular, the sanitary control valve also employs gripping-type channels on one or preferably on both sides of the resilient diaphragm of the sanitary control valve which provides a better seal of the diaphragm between the upper and lower valve members. In addition, the sanitary control valve has a minimum number of valve parts as compared to prior art, nonsanitary, pressure control valves. The sanitary control valve is particularly adapted for use with sanitary fluids typically which are refrigerated to heated fluids, for example, fluids which range from about 38° F. up to 350° F. or more, under air pressures of 100 psi or more, for example, 175 psi to 225 psi.

The sanitary control system wherein the sanitary control valve is employed comprises a source of regulated air pressure which is, for example, an air compressor, a filter for the compressed air, a pressure regulator and a pressure controller which is variable to enable the pressure to be changed into the air pressure inlet of the control valve. The system also includes a source of sanitary fluid and may include a refrigerating or heating means for the fluid and typically, a circulating pump to pump the heated or refrigerated fluid under selected pressure directly into the sanitary inlet of the sanitary control valve, while the sanitary control valve has a sanitary control outlet for the removal of sanitary fluid and directing the sanitary fluid to further processing or to a container as a finished product.

The sanitary control valve is operated by applying pressure to an air pressure port which supplies air pressure to a resilient-type diaphragm, while the sanitary, pressurized fluid is applied to a sanitary inlet port in the sanitary control valve which applies an upward pressure to the diaphragm and the valve seat. In operation, if the upward pressure from the pressurized sanitary fluid exceeds the downward pressure from regulated air, then the valve seat rises opening the valve passageway or channel from the sanitary valve inlet to the sanitary valve outlet of the valve thus relieving the fluid pressure and maintaining the back pressure constant. The upward movement of the valve seat is proportional to the pressure differential, and thus the speed of the sanitary fluid's pressure release is correspondingly proportional. Typically, the valve parts of the sanitary control valve are made of a solid, sterilizable material, such as stainles steel or a particular metal, such as inconel or titanium, while the diaphragm may comprise a resilient-type material, such as of an elastomeric or rubbery polymer or combinations thereof, such as for example, a fluorocarbon polymer, such as Teflon ®-coated Viton ® polymer, so that the sanitary level of the valve and the system is not affected by the materials.

A wide variety of sanitary fluids may be employed for use with the sanitary control valve and system, such as for example, but not limited to, any liquid or suspended solid liquid system, such as dairy products like milk, cream and whey; body fluids, such as blood; insecticides, pesticides; biological fluids, broths, and tissues; cell cultures; and the like.

The invention will be described for purposes of illustration only in connection with a particular sanitary control valve and a sanitary control valve system; however, it is recognized that those persons skilled in the art may make various changes, modifications, improvements and additions to the valve and the system, all falling within the spirit and scope of the invention.

DESCRIPTION OF THE EMBODIMENTS

Figures 1, 2:
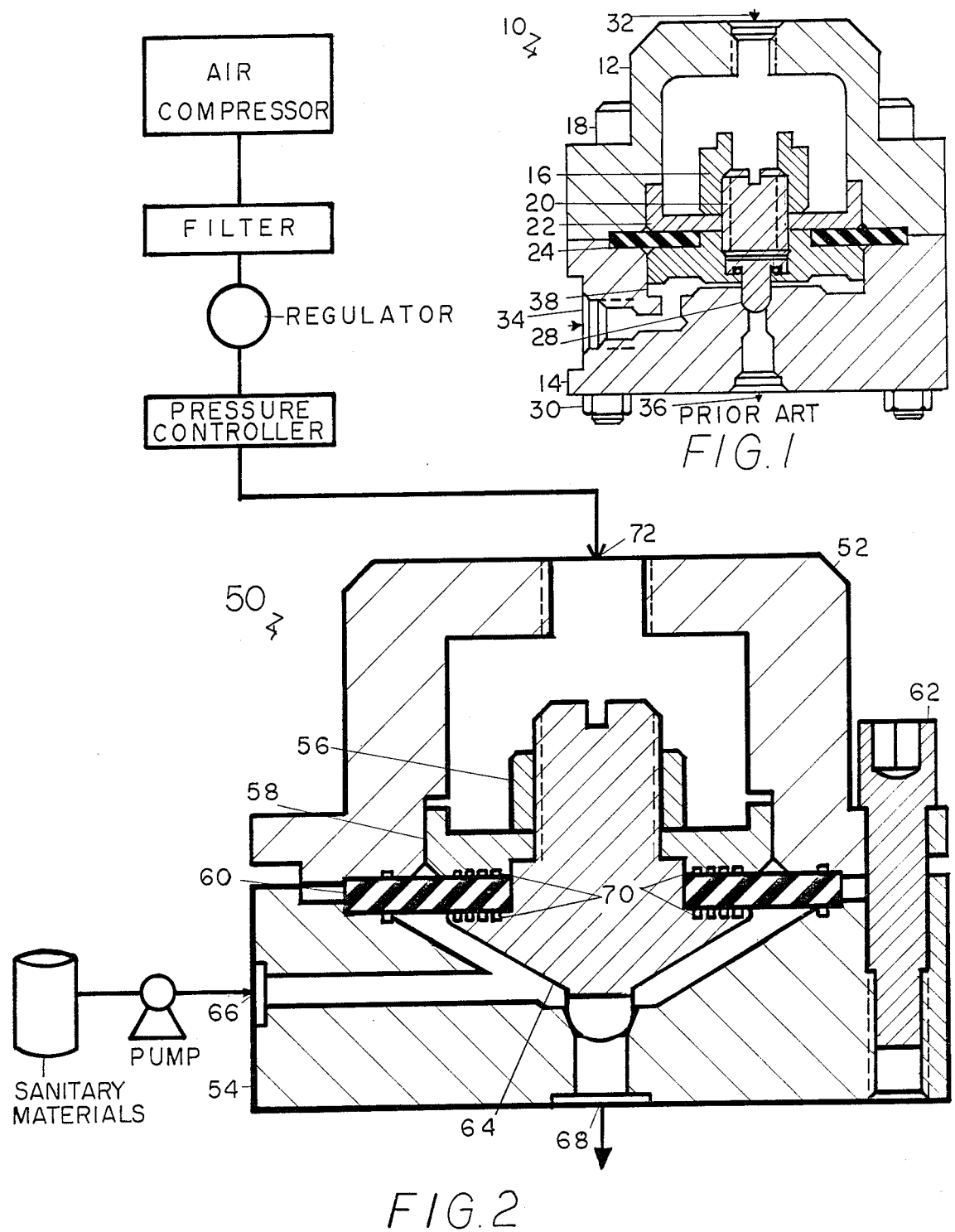
FIG. 1 is a schematic illustration of a prior art control valve.
FIG. 2 is a schematic system of a sanitary control valve system employing the sanitary control valve of the invention shown in section.

FIG. 1 is a prior art control valve 10 which includes an upper dome 12, a lower section 14, and cap screws 18 with nuts 30 to secure the parts 12 and 14 together. Valve 10 includes a seat retainer 20, a diaphragm plate for support 22 and a flexible diaphragm 24 directly below the plate separating the upper and lower parts 12 and 14. The parts define an internal passageway channel 38 defining a valve seat 28. The valve 10 includes a sanitary fluid inlet 34, a sanitary fluid outlet 36 and an air pressure inlet 32 for the introduction of pressurized air. The sanitary control valve contains valve passageways from the sanitary fluid inlet 34 to the sanitary fluid outlet 36 which are not direct and which contain cavities and nonsmooth valve corners in which the sanitary fluid and solids in the sanitary fluid can be trapped within the valve. The trapped sanitary fluid cannot be removed by flushing the passageways, and the sanitary valve 10 must be disassembled to remove entrapped fluid and/or solids from the sanitary valve. The prior art valve 10 also has a significant number of parts which makes the disassembly and cleaning of the valve difficult.

FIG. 2 is sanitary control valve system which contains a sanitary control valve 50 of the invention and which systems includes and air compressor as a source of pressurized air, a filter to filter the air, a pressure regulator to adjust the air pressure and a controller to control the pressure through the sanitary pressure controller valve 50. This system also includes a source of sanitary material and a gear, piston or other type of pump to pump the material in heated or refrigerated form to the inlet port 66 of the sanitary control valve 50. Typically, the air compressor would run at 90 psi to 250 psi, and the sanitary fluid would be delivered under pressure at about 300° F. to 350° F. under 200 psi to the sanitary inlet port 66 of the valve 50 while the air pressure would be delivered at 200 psi to the air pressure inlet 72 of the valve, and a sanitary product withdrawn from the sanitary valve outlet 68.

The valve comprises an upper valve section or dome 52, a lower valve section or body 54, a nut 56 to secure a diaphragm plate 58 and a diaphragm 60, which is a resilient diaphragm, such as a rubber coated with fluorocarbon, between the upper 52 and lower 54 valve body. In the diaphragm plate 58 and in the upper portion of the valve body 54, there are square, machined, mechanical, recessed grooves 70 in order to cut down the surface area of the diaphragm and to provide for a better diaphragm seal in the sanitary control valve 50. In valve 50, with the parts positioned to define a general valve passageway with a valve seat 64, there is an internal passageway, characterized by being a generally conical-shaped passageway, extending toward the valve seat, the passageway extending from the diaphragm to the valve seat. The valve includes cap screw 62 to secure the upper 52 and lower 54 valve parts together and includes an air inlet port 72, a sanitary fluid inlet port 66, which is a straight line port, which enters the internal passageway of the valve at a slight, say 30° to 45°, angle and leads directly from the port into the passageway while the conical, internal passageway slopes down into the valve seat 64 and into a sanitary fluid outlet port 68.

In operation, the sanitary control valve either provides fixed or variable air pressure to control the pressure applied to the sanitary fluid. In operation, the air pressure is supplied from the air compressor through the filter, regulator and pressure controller to the pressure port 72, which in turn applies a downward pressure to the diaphragm plate 58 and the diaphragm 60. The pressurized sanitary fluid is supplied to the sanitary fluid inlet 66 which in turn applies an upward fluid pressure to the lower surface of the diaphragm 60 and the seat 64. If the upward pressure from the pressurized sanitary fluid exceeds the downward pressure from the air into the port 72, then the valve seat rises opening the internal passageway from inlet 66 to 68 to discharge sanitary fluid and thus relieve the sanitary fluid pressure. The upward movement of the valve seat 64 is proportional to the pressure differential between the sanitary fluid pressure and the air pressure, and thus, the speed of the sanitary fluid's pressure relief is correspondingly proportional.

The passage from the sanitary fluid inlet 66 to the sanitary fluid outlet 68 is quite direct and does not contain any corners, areas or cavities in which the sanitary fluid can be trapped. Also, the design of the valve permits any trapped sanitary fluid to be easily removed by flushing the valve from the inlet 66 to the outlet 68 under pressure greater than the air pressure. The gripping channels 70, or channels on either side of the diaphragm 60, provide a seal for the diaphragm between the upper 52 and lower 54 valve members. Therefore, the design of the valve internal passageway is such that the sanitary fluid cannot be entrapped and thus can be flushed clean. In addition, the sanitary control valve has a reduced number of parts which simplifies any disassembly of the valve and the operation of the sanitary valve.

What is claimed is:

1. A sanitary control valve to control the pressure applied to a sanitary fluid in a sanitary fluid-contained system, which sanitary control valve comprises:

(a) a valve body comprising an upper valve member and a lower valve member and defining therebetween a generally straight line communication, frusto-conical valve internal passageway and a valve seat, the upper and lower valve members adapted to move relative to one another between an open position to permit the flow of sanitary fluid through the said valve internal passageway and the valve seat and a closed position wherein the upper and lower valve members are in a closed, mating engagement and close the valve seat to prevent the flow sanitary fluid through the valve internal passageway;

(b) a diaphragm plate means to support a resilient diaphragm disposed between said upper and lower valve members;

(c) a resilient diaphragm on the diaphragm plate means to provide a seal between the upper and lower valve members and to provide for movement of said upper and lower valve members relative to each other between the open and closed position;

(d) a plurality of generally parallel, circular, gripping-type, recessed groove means in contact with said diaphragm to provide a diaphragm seal, the groove means on the lower section of the diaphragm plate means or the upper section of the lower valve body or both;

(e) a sanitary fluid outlet in the lower valve body member in direct communication with the internal valve passageway to permit the discharge of a pressurized sanitary fluid from the sanitary control valve;

(f) a sanitary fluid inlet in the lower valve body member extending in a direct, straight line communication, generally at an inclined angle into the internal valve passageway to permit the introduction of a pressurized sanitary fluid to flow along said inclined angle into said internal passageway to flush clean such internal passageway to prevent any trap sanitary fluid therein without disassembly of said sanitary valve; and (g) a pressurized air inlet to provide controlled air pressure through the inlet and against the diaphragm so as to control the amount of pressure applied to the pressurized sanitary fluid so as to maintain the sanitary fluid under a fixed pressure thereby providing for the discharge of a constant pressurized sanitary fluid from the sanitary fluid outlet.

2. The sanitary control valve of claim 1 wherein the sanitary fluid inlet is in direct, straight line, smooth bore communication with the internal valve passageway in the lower valve body and entering said passageway at an angle of about 30° to 45°.

3. The sanitary control valve of claim 1 wherein the diaphragm comprises an elastomeric or polymeric material.

4. The sanitary fluid system which system comprises the sanitary control valve of claim 1 and which includes:

(a) a source of pressure-regulated air;
(b) means for directing the air into an air pressure inlet of the sanitary control valve;
(c) a source of sanitary fluid to be controlled;
(d) a pump means to provide a pressurized sanitary fluid from the said source; and
(f) a means to introduce a pressurized sanitary fluid into the sanitary fluid inlet of the said control valve whereby pressure applied to the sanitary fluid is controlled by the air pressure from the air pressure source so that the pressure applied to the fluid is kept constant even though the pressurized sanitary fluid is subject to other variables.

5. The sanitary control valve of claim 1 wherein the diaphragm comprises a fluorocarbon-coated rubber material.

6. A sanitary fluid system to control the pressure applied to a sanitary fluid in such system, which sanitary control system comprises in combination:

(a) a sanitary control valve which comprises:
(i) a valve body comprising an upper valve member and a lower valve member and defining therebetween in a generally frusto-conical valve internal passageway and a valve seat, the upper and lower valve members adapted to move relative to one another between an open position to permit the flow of sanitary fluid through the internal passageway and the valve seat and a closed position wherein the upper and lower valve members are in a closed, mating engagement and close the valve seat to prevent the flow sanitary fluid through the valve internal passageway;

(ii) a diaphragm plate means to support a resilient diaphragm disposed between said upper and lower valve members;

(iii) a resilient diaphragm on the diaphragm plate means to provide a seal between the upper and lower valve members and to provide for movement of said upper and lower valve members relative to each other between the open and closed position;

(iv) a sanitary fluid outlet in the lower valve body member in direct communication with the internal valve passageway to permit the discharge of a pressurized sanitary fluid from the sanitary control valve;

(v) a sanitary flud inlet in the lower valve body member extending in a direct, straight line communication, generally at an inclined angle into the internal valve passageway to permit the introduction of a pressurized sanitary fluid to flow along said inclined angle into said internal passageway to flush clean such internal passageway to prevent any trap sanitary fluid therein without disassembly of said sanitary valve;

(vi) a pressurized air inlet to provide controlled air pressure through the inlet and against the diaphragm so as to control the amount of pressure applied to the pressurized sanitary fluid so as to maintain the sanitary fluid under a fixed pressure thereby providing for the discharge of a constant pressurized sanitary fluid from the sanitary fluid outlet;

(b) a pressure regulated air means to supply a source of pressure regulated air;
(c) a piping supply means for directing the pressure regulated air from the pressure regulated air means into the air pressure inlet of the sanitary control valve;
(d) a source of sanitary fluid to be controlled;
(e) a pump means to provide a pressurized sanitary fluid from said source; and
(f) a pipe means to introduce the pressurized sanitary fluid into the sanitary fluid inlet of the said control valve
whereby pressure applied to the sanitary fluid is controlled by the air pressure from the regulated air pressure means so that pressure applied to the sanitary fluid is kept constant even though the pressurized sanitary fluid supplied is subject to other variables.

7. The sanitary fluid system of claim 6 wherein the diaphragm of the sanitary control valve comprises a fluorocarbon-coated rubber material diaphragm.

* * * * *